US010882879B2

(12) United States Patent
Tomani et al.

(10) Patent No.: US 10,882,879 B2
(45) Date of Patent: Jan. 5, 2021

(54) METHOD OF PRODUCING LIGNIN WITH REDUCED AMOUNT OF ODOROUS SUBSTANCES

(71) Applicant: VALMET AB, Sundsvall (SE)

(72) Inventors: Per Tomani, Huddinge (SE); Fernando Alvarado, Stockholm (SE); Maria Sedin, Solna (SE)

(73) Assignee: VALMET AB, Sundsvall (SE)

( * ) Notice: Subject to any disclaimer, the term of this patent is extended or adjusted under 35 U.S.C. 154(b) by 63 days.

(21) Appl. No.: 16/311,357

(22) PCT Filed: Jun. 19, 2017

(86) PCT No.: PCT/SE2017/050665
§ 371 (c)(1),
(2) Date: Dec. 19, 2018

(87) PCT Pub. No.: WO2018/004427
PCT Pub. Date: Jan. 4, 2018

(65) Prior Publication Data
US 2020/0109157 A1  Apr. 9, 2020

(30) Foreign Application Priority Data

Jun. 22, 2016  (SE) ...................... 1650898

(51) Int. Cl.
C07G 1/00    (2011.01)
B01D 11/00   (2006.01)
(Continued)

(52) U.S. Cl.
CPC ............... C07G 1/00 (2013.01); B01D 11/00 (2013.01); C08H 6/00 (2013.01); C08L 97/005 (2013.01);
(Continued)

(58) Field of Classification Search
None
See application file for complete search history.

(56) References Cited

U.S. PATENT DOCUMENTS 296,935 A * 4/1884 Dahl .................. D21C 3/022
                                              162/82
1,856,558 A * 5/1932 Howard ............... D21C 11/02
                                              530/500
(Continued)

FOREIGN PATENT DOCUMENTS

CN        101503431 A        8/2009
DE    10 2014 108 841 B3     5/2015
(Continued)

OTHER PUBLICATIONS

Composition of Black Liquor, Chapter 1, Wood Pulping, pp. 158-164, (Year: 1993).*

(Continued)

Primary Examiner — Peter A Salamon
(74) Attorney, Agent, or Firm — Foley & Lardner LLP

(57) ABSTRACT

The present invention relates to a method of producing lignin with reduced amount of odorous substances comprising the steps of: i) providing a solid phase lignin containing starting material to be contacted with a water solution comprising alcohol; ii) dissolving at least guaiacol and etylguaiacol content from the lignin into the water solution, and iii) draining off the water solution with its content of guaiacol and etylguaiacol; iv) obtaining a lignin material with a reduced content guaiacol and etylguaiacol. The alcohol is preferably a C1-C4 alcohol, preferably ethanol. The invention also relates to a lignin product with reduced odour obtained and/or obtainable by the method and to the use of the obtained lignin as a component in polymer blends, an additive or filler in building materials, as binding agent in (Continued)

adhesives, and/or for the production of a carbon fibre, especially in indoor applications.

19 Claims, 4 Drawing Sheets

(51) Int. Cl.
- C08H 6/00 (2010.01)
- C08H 7/00 (2011.01)
- C08L 97/00 (2006.01)
- C09J 197/00 (2006.01)
- D01F 9/17 (2006.01)
- D21C 11/00 (2006.01)

(52) U.S. Cl.
CPC ............ C09J 197/005 (2013.01); D01F 9/17 (2013.01); D21C 11/0007 (2013.01); *B01D 2257/306* (2013.01)

(56) References Cited

U.S. PATENT DOCUMENTS

| | | | | |
|---|---|---|---|---|
| 2,037,001 | A * | 4/1936 | Aronovsky | D21C 3/20 162/14 |
| 2,057,117 | A * | 10/1936 | Richter | C07C 37/54 568/426 |
| 2,104,701 | A * | 1/1938 | Sandborn | B04B 5/10 568/426 |
| 2,166,540 | A * | 7/1939 | Bailey | D21C 3/20 162/37 |
| 2,405,450 | A * | 8/1946 | Richter | C08H 6/00 530/507 |
| 2,744,927 | A | 5/1956 | Copenhaver et al. | |
| 3,097,988 | A * | 7/1963 | Schoeffel | D21C 11/0085 162/31 |
| 4,265,809 | A | 5/1981 | Holsopple et al. | |
| 4,764,596 | A | 8/1988 | Lora et al. | |
| 9,617,393 | B2 * | 4/2017 | Tomani | C09J 197/005 |
| 2003/0221804 | A1 | 12/2003 | Lightner | |
| 2008/0214796 | A1 * | 9/2008 | Tomani | D21C 11/0007 530/500 |
| 2013/0217869 | A1 | 8/2013 | Ters et al. | |
| 2014/0186627 | A1 * | 7/2014 | Pu | C07G 1/00 428/402 |
| 2014/0288285 | A1 | 9/2014 | Ters et al. | |
| 2016/0076199 | A1 * | 3/2016 | Lake | D21C 9/002 162/16 |
| 2016/0137680 | A1 * | 5/2016 | Thies | B01D 11/00 530/507 |
| 2016/0177040 | A1 * | 6/2016 | Tomani | C08L 97/005 530/507 |
| 2020/0109157 | A1 * | 4/2020 | Tomani | C07G 1/00 |

FOREIGN PATENT DOCUMENTS

| | | | |
|---|---|---|---|
| JP | | 2013-35886 A | 2/2013 |
| SE | | 1451641 A1 | 7/2016 |
| WO | WO | 2006/031175 A1 | 3/2006 |
| WO | WO | 2012/161865 A1 | 11/2012 |
| WO | WO-2013/083876 A2 | 6/2013 |
| WO | WO-2013/182751 A1 | 12/2013 |
| WO | WO | 2014/116150 A1 | 7/2014 |
| WO | WO-2014/116173 A1 | 7/2014 |
| WO | WO | 2015/185794 A1 | 12/2015 |
| WO | WO | 2016/105259 A1 | 6/2016 |

OTHER PUBLICATIONS

U.S. Appl. No. 16/311,012, filed Dec. 18, 2018, VALMET AB.
E. Sjöström, Composition of Black Liquor, In: Wood Chemistry Fundamentals and Applications, 1993, pp. 158-0160.
F. Öhman et al., A Novel Method for Washing Lignin Precipitated from Kraft Black Liquor—Laboratory Trials, In: Nordic Pulp and Paper Research Journal, Vo. 22, No. 1, 2007, pp. 9-16.
Intention to Grant for related Swedish Appl. No. 1451641-3, including claims in English, dated Jun. 25, 2015, pp. 1 (3) to 3 (3), application pp. 1-19, and figure pp. 1-4.
International Search Report issued in PCT/SE2015/051214 dated Mar. 9, 2016, 5 pages.
Morck, Roland, et al, "Fractionation of Kraft Lignin by Successive Extraction with Organic Solvents," Holzforschung, vol. 42, No. 2, pp. 111-116, 1988.
Ponomarkenko, Jevgenija, et al, "Characterization of Softwood and Hardwood LignoBoost Kraft Lignins with Emphasis on their Antioxidant Activity," Bioresources, vol. 9, No. 2, pp. 2051-2068, 2014.

* cited by examiner

US 10,882,879 B2

METHOD OF PRODUCING LIGNIN WITH REDUCED AMOUNT OF ODOROUS SUBSTANCES

TECHNICAL FIELD

The present invention relates to a method of producing or treating lignin in order to reduce its amount of odorous substances, to a lignin product obtained and to a use of the lignin product.

BACKGROUND ART

Lignin is a complex polymer occurring in certain plant walls making the plant rigid. Bonds linking lignin to cellulose are broken during a chemical pulping process. Lignin isolation from black liquor has been used during past years to provide lignin for commercial use, for example for use as a solid biofuel and dispersant. This lignin is also a valuable material for production of "green chemicals" and as a fuel for the production of chemicals. The production process of lignin of that kind is described for example in WO2006/031 175. According to the process, lignin is separated from black liquor. The separation method may include steps to acidify the black liquor so that the lignin is precipitated. The solid phase is then separated from the liquor and can thereafter be cleaned or modified.

However, there is a desire to use lignin products also in other applications than fuel applications. The lignin product obtained by the isolation process is a renewable, non-poisonous environmentally friendly product which could be used for example as a raw material for building materials. However, the obtained lignin product suffers from a drawback of being malodorous, whereby the use of the product has been limited to few applications.

There is thus a great desire to reduce or eliminate the problems with odour in lignin products.

In the prior art, there have been attempts to reduce odour levels in lignin products.

WO 2012/161 865 discloses a method in which pressurized black liquor may be reacted with an oxidizing agent, such as oxygen, peroxide or the like, in an amount sufficient to reduce or eliminate the odour level in the black liquor so that there will be little or no odour in the final lignin product. This step removes the odours by oxidating mercaptans (methyl, ethyl), and dimethyl, diethyl sulphides etc. However, with this process there is a risk that also lignin is oxidized and thus deteriorated or chemically modified.

There are still further documents related to pulping processes and treatment of lignin, e.g. in order to reduce impurities, such as CN 101 503 431, JP 2013/035 886, WO 2014/116 150 and US 2016/137 680.

Even though there are prior art solutions for the reduction of odour levels, especially in respect of mercaptans, there is still a need for a process that removes other organic odorous compounds effectively. There is also a need for a process in which lignin is treated carefully such that its chemical structure and bondings remain to a large extent and in which lignin is not essentially fractionated by the odour reduction process. There is also need for an environmentally friendly process with a reduced risk for hazards in the production process. It is further an advantage if the dour reduction process can be integrated with lignin separation processes in a simple way.

SUMMARY OF THE INVENTION

The object of the present invention is to provide a method for reducing the amount of odorous substances in lignin products. It is also desired to provide a method for the production of a product in which lignin is treated carefully such that its chemical structure and bondings remain to a large extent and in which lignin is not severely fractionated due to odour reduction. It is also desired to provide a method for producing less odorous lignin products with a method that can result in high yield. It is also desired to provide a method which is environmentally friendly. Preferably could the method be used in connection with and/or integrated with available processes for separating lignin, i.e. the production of lignin products, as well as being able to be used for treatment of lignin in various forms after it has been separated and/or purified, e.g. in a pulping process.

The present method aims to address the above object and desires of producing or modifying lignin wherein lignin with reduced amount of odorous substances is obtained. The method is based on the idea of using an alcohol in a solution in order to be in contact with the lignin to be produced or treated. The lignin is present as solid matter, i.e. solid phase lignin containing material, which is mixed or washed with alcohol. This treatment may be performed during a pulping process when lignin is isolated or may be used for refined lignin.

Hence, the method may be simply described to comprise the steps of.

providing a solid phase lignin containing starting material to be contacted with a water solution comprising alcohol;

dissolving at least guaiacol and etylguaiacol content from the lignin into the water solution. In tests, it has been verified that at least these compounds are dissolved into the alcohol liquid phase, and draining off the water solution with its content of guaiacol and etylguaiacol;

obtaining a lignin material with a reduced content guaiacol and etylguaiacol.

One advantage by using treatment with alcohol is that it is not necessary to dissolve the lignin if it is present in solid phase, e.g. precipitated lignin isolated from black liquor in an alkaline chemical pulping process. Hence, the process works for solid lignin, e.g. particulate lignin forming a slurry with an alcohol containing solution, as well as when lignin is dissolved in the alcohol containing solution. To be noted, by solid state is meant that the lignin itself is in solid state but it may be in a liquid solution, e.g. particulate lignin in a solution together forming slurry. It has been found to function very well subjecting the solid phase lignin containing starting material to a displacement wash using the water solution comprising alcohol in order to dissolve undesired impurities and at least guaiacol and etylguaiacol content from the lignin are solved into the water solution. The lignin containing starting material could in this case be an entire filter cake which is subjected to a displacement wash.

It has turned out that it has been beneficial in many ways to use alcohol for washing solid state lignin in order to reduce odors. It seems like alcohol has a high affinity for odorous compounds comprised in the lignin. When the solid lignin is being washed by alcohol, it has turned out odorous compounds such as guaiacol and etylguaiacol dissolve surprisingly well in the alcohol while leaving the lignin molecules themselves rather intact.

According to a preferred embodiment of the invention has the lignin containing starting material a dry matter content above 50% (w/w), and a lignin content of this dry matter content exceeding 50% (w/w). To be noted, unless otherwise indicated are all percentages and relative proportions used herein meant to denote percentage or proportions by weight (w/w).

It is thus in particular advantageous to be able to use this method when lignin in solid state is present and still have a need for odour treatment since there is no need to dissolve the lignin once again. For example, if solid lignin from a filter cake is used could the filter cake be disintegrated into smaller particles and located in an alcohol containing water solution and thereafter dried once again. This could be easily done for a wet filter cake which may easily be disintegrated if placed in a solution and it may even be possible to merely stir the solution in a tank to make the filter cake be divided to rather small particles forming slurry. Alternatively, the filter cake could be washed with an alcohol containing solution when still on the filter. As still an alternative, a dry lignin filter cake could be immersed in an alcohol solution, either as one piece or integrated into smaller blocks, or even mechanically treated to form smaller particles, so as to form slurry with the alcohol containing solution. Hence, there are many ways in which the method may be advantageously used and it may be possible to maintain the lignin in solid phase and avoid dissolving the lignin and thus avoiding suspending and re-precipitating of solid lignin.

The solid state material to be used have preferably been prepared and purified to mainly comprise lignin such that the solid phase material have a lignin content above 80%, more preferably above 90% and most preferably above 95% by weight. The method will work even if the relative amount of lignin is below 80% by weight but there is less risk for negative interference by undesired solid components if there is high purity of lignin in the solid phase.

The solid starting material comprising lignin may for example be a filter cake which may be classified as dry or wet as described above. What is considered to be dry or wet may of course differ. However, herein will the definitions as follows be used and a wet filter cake is defined as having a dry content of below 35%, a semi-wet filter cake having a dry content from 35% to 50%, a semi-dry filter cake having a dry content of above 50% to 65% and a dry filter cake having a dry content above 65%. The lignin must of course not be from a filter cake even though it is common. The same dry contents will be used also for classifying water content of lignin generally even if it's not in the shape of, or originates from, a filter cake.

The use of lignin as a semi-dry or dry filter cake as starting material is in particular suitable if the lignin is needed to be stored or transported in order to reduce the weight and/or volume of the lignin containing mass. The lignin may thereafter be mechanically treated and for example be in the shape of small particles and/or larger blocks which are immersed in a solution, e.g. to form a slurry, or may be used as a continuous solid mass which is subjected to a through flow, e.g. a filter cake.

The use of a wet filter cake as a starting material is in particular suitable if the odour reducing step is a part of the pulping process or performed in association with the pulping process, e.g. in or in close vicinity to the pulping process plant. As is obvious, a wet filter cake will be easier to disintegrate, e.g. into small particles forming a slurry with the liquid solution, than a dry filter cake and it will thus be needed less work, or less time in the alcohol containing solution, in order to extract or leach the undesired components comprised in the solid lignin, e.g. particles forming part of a slurry.

The lignin may be mixed with the alcohol containing liquid solution in a reaction tank. The tank may be provided with some arrangement for stirring or for circulating the solution in order to improve the leaching or extraction process. In a non-limiting example, the residence time may for example be from 10 minutes up to 2 hours. The residence time needed to achieve a desired effect is dependent on for example the size of the particles, the stirring, the purity of the lignin and concentration of alcohol in the solution/proportions of alcohol and lignin. The temperature may also affect the desired retention time. However, the process works perfectly well at normal room temperature (18-25 degrees Celsius) but other temperatures could also be used.

The process could for example include a heating of the slurry/solution up to a temperature between 50 and 90 degrees Celsius. Concerning the size of the solid lignin in the process tank may it be between one extreme where one or several complete filter cakes are leached to the other extreme wherein the lignin is present as microscopic particles.

After the alcohol treatment, the solution with solid particles, e.g. a slurry, is normally dewatered and filtrated such that there is a new filter cake built up, possibly followed by one or several drying steps.

The alcohol treatment could also, in addition to or as an alternative, be used on a filter cake and by forcing a alcohol containing liquid solution through the filter cake, e.g. in connection with washing or dewatering of the filter cake.

The amount of alcohol to be used may be defined either as the concentration of alcohol in the solution or the weight percentage of alcohol to lignin. In general, rather small amounts of alcohol are needed and a solution having 1% (w/w) of alcohol may be enough. However, a higher concentration may decrease the time needed for removing the undesired components and if there are other components present as solid particles or in the solution, these impurities may interfere with the process and higher concentrations may be desired. Hence, it may be desired to use concentrations above 5% (w/w) and even up to 30%. Even though higher concentrations also function very well and even better from the aspect of removing the undesired components, such concentrations are often disregarded due to cost aspects and also a possible lowered yield of lignin after the treatment due to the high alcohol concentration. However, there is no essential upper limit of the alcohol concentration from the aspect of making the solution work in removing undesired substances from lignin. In the other end of the range, very low concentrations also shows an effect and undesired components are removed even if as low concentrations as 0.1% (w/w) or lower is used. From 0.2% there is a significant increase in the efficiency and already above 0.5% is the system working very efficient. Hence, concentrations of alcohol of at least 0.1% (w/w) in the solution is applicable, more preferred are concentrations from 0.2 preferred and for industrial use are appropriate concentrations in the interval of 0.1 to 30% (w/w), preferably between 0.2 to 20% (w/w) and in most cases is 0.5-10% (w/w) desired.

The amount of alcohol could also be defined in relation to the amount of lignin to be treated. Low concentrations of the alcohol containing solution may not be appropriate to use if the total amount of lignin is comparatively high to the amount of solution used, in particular if the solid phase lignin is of low purity and the process may be disturbed by contaminants. In general, it is desired to have a proportion of alcohol:lignin in which the amount of alcohol is more than 1:200, in general more than 1:100 and in most cases more than 1:50. A suitable proportion which is used with adequate results is 1:10. There may of course be even higher concentrations and a proportion of 1:3 or even 1:1 may work efficiently but in general is it desired to keep the relations lower in order to reduce the amount of alcohol used in order to reduce costs and unnecessary additional processing time in regaining the acid. By using a proportion of alcohol to lignin, in which the amount of alcohol is less than 1:3, it will in general provide for an extraction of the odorous substances while lignin in itself is not affected too much. Thus, lignin is substantially not fractionated due to addition of alcohol and a high yield of lignin can still be obtained.

The alcohol is preferably a C1-C4 alcohol, e.g. methanol, ethanol, propanol or butanol. Higher carbon chain alcohols may also be used but are generally considered to be less common to use due to the reason they are in general less common and more expensive. However, they would also work in the same way if used in the process and reduce the amount of undesired substances.

To provide a product useful in different applications, the method can further comprise the steps of:
  dewatering and/or filtrating the solid lignin;
  washing the solid lignin; and
  drying the solid lignin.

The dried lignin from can thus be used as such for different applications such as filler for building and construction materials, also aimed for in-house applications due to the reduced or eliminated odour.

The lignin containing starting material to be treated can be lignin isolated from black liquor in an alkaline chemical pulping process. The black liquor can be soda or kraft black liquor.

The lignin containing starting material can be obtained from a process comprising the steps of:
  a) precipitating lignin by acidifying black liquor obtained from the alkaline chemical pulping process;
  b) dewatering and/or filtrating the obtained lignin to provide a filter cake;
  c) re-suspending the lignin;
  d) adjusting the pH of the obtained suspension in step c) to a pH lower than 6;
  e) dewatering and/or filtrating the acidic suspension from step d) to provide a filter cake; and
  f) washing and dewatering the filter cake.

Preferably, pH in step d) is adjusted to be lower than 4, such as equal with or lower than 3.5, e.g. 2-2.5, so that as much lignin as possible is re-suspended and thus a high yield and good filtration properties in the following filtration operations e) and f) can be obtained.

Prior to the step a), the process may comprise a pre-step in which black liquor is fractionated by filtration by for example membrane filtration such as micro- and ultra-filtration. By the mechanical separation it is possible to separate for example particulate material, hemicelluloses and/or it is possible to mechanically fractionate lignin and to obtain a specific fraction of lignin. In this way it is possible to obtain at least partially purified starting material and/or lignin fraction while high yield can be obtained since lignin is not substantially chemically affected. Another way to achieve fractions of lignin is a fractionation by means of different pH levels and select lignins from a certain pH-window for further processing.

Herein, by a filter cake is meant a filter cake comprising or consisting of lignin. The washed filter cake can be directly used in step i) above, and the method of producing lignin with reduced odour, i.e. the odour-treatment, can be integrated into the process for obtaining lignin from black liquor. In this way energy savings are possible, since lignin needs not to be dried before the odour treatment. However, it is also possible to dry the lignin as a last step in the process for obtaining lignin, wherein the process further comprises the step of:
  g) drying the filter cake By dewatering and drying the filter cake it will be easy to transport and thus for example the odour treatment can be made in another factory.

To further increase odour reduction the process for obtaining lignin, also called for lignin separation or isolation process, can also comprise the step of adding a alcohol prior to, during or after precipitation in step a), and/or adding a alcohol prior to, during or after at least one of the dewatering and/or washing steps b), e) and f) to reduce the amount of odorous substances. It is in particular adequate to add alcohol at some time after the pH-adjusting step, either in any of the steps e or f in the lignin obtaining process or in an additional step or process after these steps. The alcohol may suitably be used together with acids such as sulfuric acid in steps e) and f). By the addition of alcohol during the lignin separation, the odour reduction may be further improved. It could also be possible to use a carboxylic acid in this step, e.g. methanoic acid or ethanoic acid, which could improve the removal of undesired, odorous substances in the lignin.

The alcohol can be added in the process in an amount as previously disclosed. From the point of view of desiring a high yield of lignin, whereby lignin not is severely affected, and essentially no fractionation of lignin is occurred may the higher ranges of the intervals for the alcohol concentration be avoided while from the point of view of extracting undesired content in the lignin may it be desired to avoid the lower ranges of the alcohol concentrations disclosed. Hence, depending on the desired yield and purifying efficiency, a suitable alcohol concentration could be selected.

In step i) may suitably be used lignin obtained from kraft pulping process. Kraft pulping process has been found to be especially suitable for lignin separation, as disclosed e.g. by "Tomani, Per; The Lignoboost Process; Cellulose Chem Technol., 44(1.-3), 53-58 (2010).

The present method of producing lignin with reduced amount of odorous substance have been tested to result in yield which is over 80% by weight, based on the weight of the isolated lignin before the treatment, and even over 85%. Thus, the method leads only to minor material losses.

The odorous substances that are extracted with the present method comprise at least guaiacol or etylguaiacol, but preferably also any residual content of at least one of dimethyl sulphide, dimethyldisulphide, dimethyltrisulphide, dimethyltetrasulphide, and other phenolic compounds. In tests the content of guaiacol or etylguaiacol has been used to verify the functionality of the cleaning process These substances cause very bad odour which has made lignin products difficult to use in indoor applications. Also other odorous substances, e.g. organic substances having low concentrations, can be extracted by means of the present method. The concentration of the odorous substances has been proved to be reduced by at least 50%, the concentration being calculated from a peak area of a respective peak in a chromatogram. Preferably, the concentration of the odorous substances is reduced by at least 70%.

The method also preferably comprises at least partially recirculating the alcohol back into process and thus cost savings can be obtained while the process can be made more environmentally friendly.

In an advantageous embodiment is the alcohol used ethanol. A water solution with ethanol effectively dissolves organic malodorous substances, and especially guaiacol dissolves better in ethanol than in other alcohols whereby the use of ethanol is especially advantageous.

The present invention also relates to a lignin product with reduced odour obtained and/or obtainable by the above-defined method. The method enables a yield of the obtained lignin which is more than 80% by weight, based on the weight of the lignin containing starting material. Also, the concentration of the odorous substances in the obtained lignin product is at least 50% less and preferably less than 70% than in a corresponding untreated lignin, the concentration being calculated from a peak area of a respective peak in a chromatogram. Thus, the odour problems in connection with lignin products have been reduced substantially.

The present invention also relates to a use of the lignin product as defined above as a component in polymer blends, additives or fillers in building materials; as binding agent in adhesives, and/or for the production of a carbon fibre. The lignin product can also be used in building and construction materials that are intended for use indoors. Further application areas are for example manufacturing of fibre boards, car panels, as a cross-linking agent in vehicle tyres, as antioxidants and as UV-protectors. The application areas are not limited to the above-mentioned areas, other application areas are possible.

Further objects, features and advantages of the present invention will be described with reference to the detailed description below and to the appended drawings.

DETAILED DESCRIPTION

Figure 1:
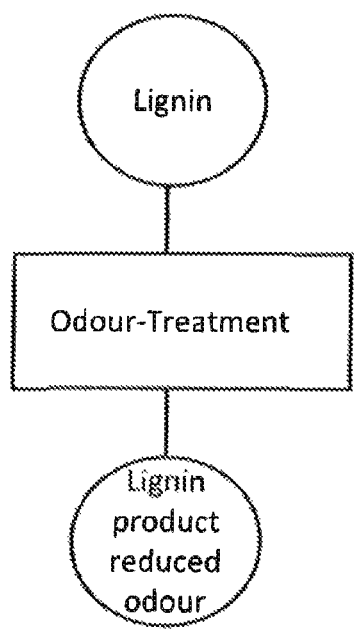
FIG. 1 shows a flow chart illustration of the method according to the invention.

In the method of the present invention, which is schematically illustrated in a flow chart in FIG. 1, is lignin treated to obtain a lignin product with reduced odour. By "lignin" is meant any lignin, which may be pure lignin or lignin with small amounts of impurities, and with dry matter content above 50% and more than 50% of this dry matter content being lignin, also referred to isolated lignin. According to the present method, the amount or concentration of the odorous substances can be reduced in lignin products while it is possible to obtain high yield of lignin.

The less odorous or substantially odourless lignin product can be used in a wide range of applications including indoor applications which is a huge advantage.

Lignin to be treated by the present method is according to one aspect obtained as a by-product from an alkaline chemical pulping process. The alkaline chemical pulping process may be sulphate, also called kraft, process or soda process. Both processes result in alkaline material by cooking the fibre-based material in white liquor at a cooking temperature of from about 130-200° C. to make lignin soluble in the cooking liquor. White liquor is a mixture of sodium hydroxide and sodium sulphide. By black liquor is meant the cooking liquor obtained during cooking from the alkaline chemical pulping process. Black liquor contains residues of white liquor and other pulping chemicals, lignin, hemicelluloses and other extractives from the fibre-based material. Even though the process is exemplified by the above processes may lignin isolated by any process be used in this method, in most cases could the lignin also be treated during the process itself.

The fibre-based material from which the isolated lignin is extracted can be softwood, hardwood or non-wood, such as annual plants. The softwood tree species can be for example, but are not limited to: spruce, pine, fir, larch, cedar, and hemlock. Examples of hardwood species from which pulp useful as a starting material in the present invention can be derived include, but are not limited to: birch, oak, poplar, beech, eucalyptus, acacia, maple, alder, aspen, gum trees and gmelina. Preferably, the fibre-based material mainly comprises softwood. The fibre-based material may comprise a mixture of different softwoods, e.g. pine and spruce. The fibre-based material may also comprise a non-wood raw material, such as bamboo and bagasse. The fibre-based material may also be a mixture of at least two of softwood, hardwood and/or non-wood. Hence, the origin of the lignin is of less importance and the method should be useful for any lignin regardless of its origin.

The amount of odorous or odour containing substances can be reduced in the lignin product by means of extracting. Especially, organic malodorous substances can be extracted by the present method. Extracting is suitably selective, meaning that substantially mainly the odorous or odour containing substances are extracted. The extraction is obtained by means of the addition of alcohol to a water solution, slurry or a solid body comprising lignin. The odorous substances are extracted in or leached by alcohol, e.g. methanol, ethanol, propanol or butanol, in order to remove odorous substances from the lignin. In general, C1-C4 alcohols are considered most suitable for this process. The amount of the alcohol to be added should be kept at a sufficiently low level to avoid that lignin is seriously affected. In general, the amount of alcohol to be added is less than 30%, and the amount may suitably be 0.2 to about 20%, based on the dry weight of lignin. As previously discussed, the amount of alcohol could be decided based on the desired level of purification and not use more than needed to reach this level. The alcohol including the extracted odorous substances is removed from the process and optionally recirculated at least partly back in the process.

Figure 2:
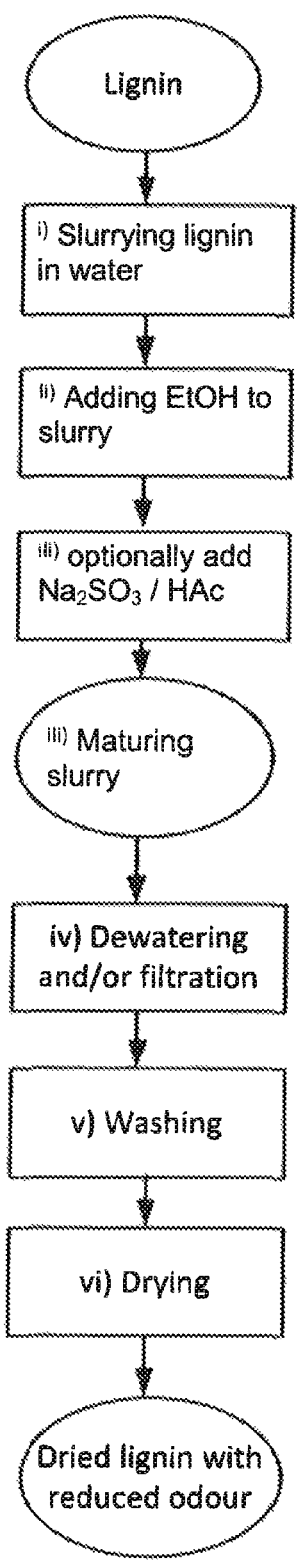
FIG. 2 shows a flow chart illustration of an example method according to the present invention.

Reference is now made to FIG. 2 in which a process involving the method of the present invention is schematically illustrated more in detail The lignin is preferably slurried in water in stage i), and thereafter is alcohol (EtOH) added in step ii), However the method also works if alcohol is mixed into the water before adding to the lignin. In step iii) may also optionally carboxylic acid (HAc) and/or sodiumsulfite ($Na_2SO_3$) be added to the water or lignin slurry. The method may comprise a maturing period of desired length that should last for at least 5 minutes, preferably at least 30-60 minutes, or even longer if sufficient storage volume is available. The maturing period can be adjusted by the skilled person to different processes and needs. Depending on the state of the lignin, the maturing may be desired to continue for different times. In case the lignin is dissolved in a solution a shorter time may be needed compared to if the lignin is present as particles, e.g. from a dissolving a wet filter cake. In case the lignin is present as even larger entities, e.g. as a solid, dry filter cake or larger particles, could even longer time be desired to partly disintegrate the larger entities and/or allowing the alcohol solution to be better soaked into the solid matter in order to enable a more efficient leaching operation.

After leaching is the slurry dewatered obtaining a lignin product with fewer odours, and explicitly with a substantial reduction in guaiacol and/or etylguaiacol.

However, in most applications the lignin needs to be transported so that lignin can be used in different applications and solid lignin, either re-precipitated or present as solid matter in the extraction/leaching operation from the process, may thus be subject for dewatering and possibly filtering, washing and drying if desired. As further illustrated in FIG. 2, the method can thus comprise a step iv) in which lignin in the form of a filter cake is dewatered and/or filtrated. Dewatering can be performed by any means to withdraw water. For example, the dewatering is performed by using centrifugation, a filter press apparatus, a band filter, a rotary filter, such as a drum filter, or a sedimentation tank, or similar equipment. Filtration can be performed by using any conventional apparatus suitable for filtration, such as filter press or a band filter. The filtrate from the dewatering step can be re-circulated to a recovery system, and the alcohol can be further recirculated back in the process. Subsequent to dewatering and/or filtration, the obtained lignin in the form of a filter cake is washed in step v). Washing can be performed by using water and/or small amounts of alcohol, e.g. 0.5-10% by weight based on the weight of lignin, such as ethanoic acid. Also during the wash, it is advantageous if the pH is kept acidic, such as from pH 1.5 to pH 5, preferably from pH 1.5 to pH 3.5. In this way the yield of lignin can be further increased. After washing, the obtained filter cake is dried in step vi) and a final lignin product with reduced odour is obtained.

Figure 3:
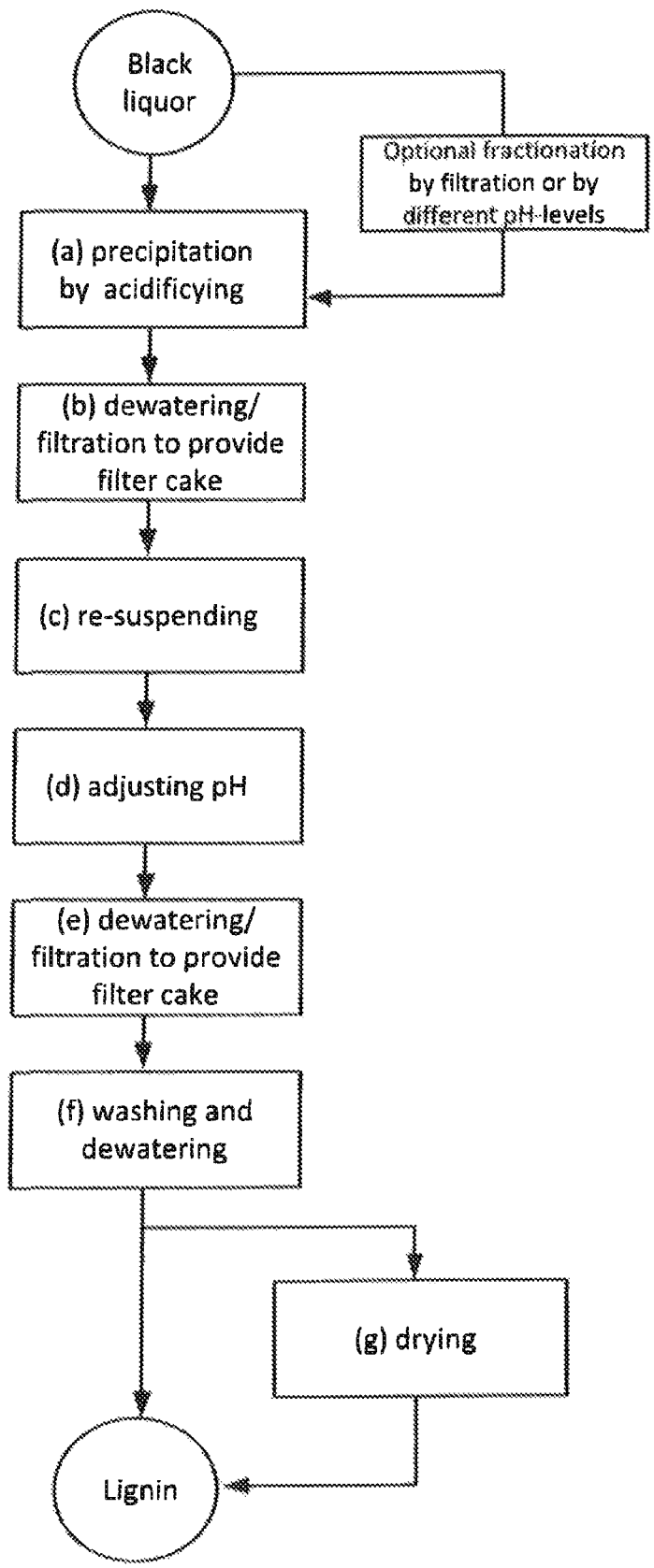
FIG. 3 shows a flow chart illustration of a process for lignin isolation.
Figure 4:
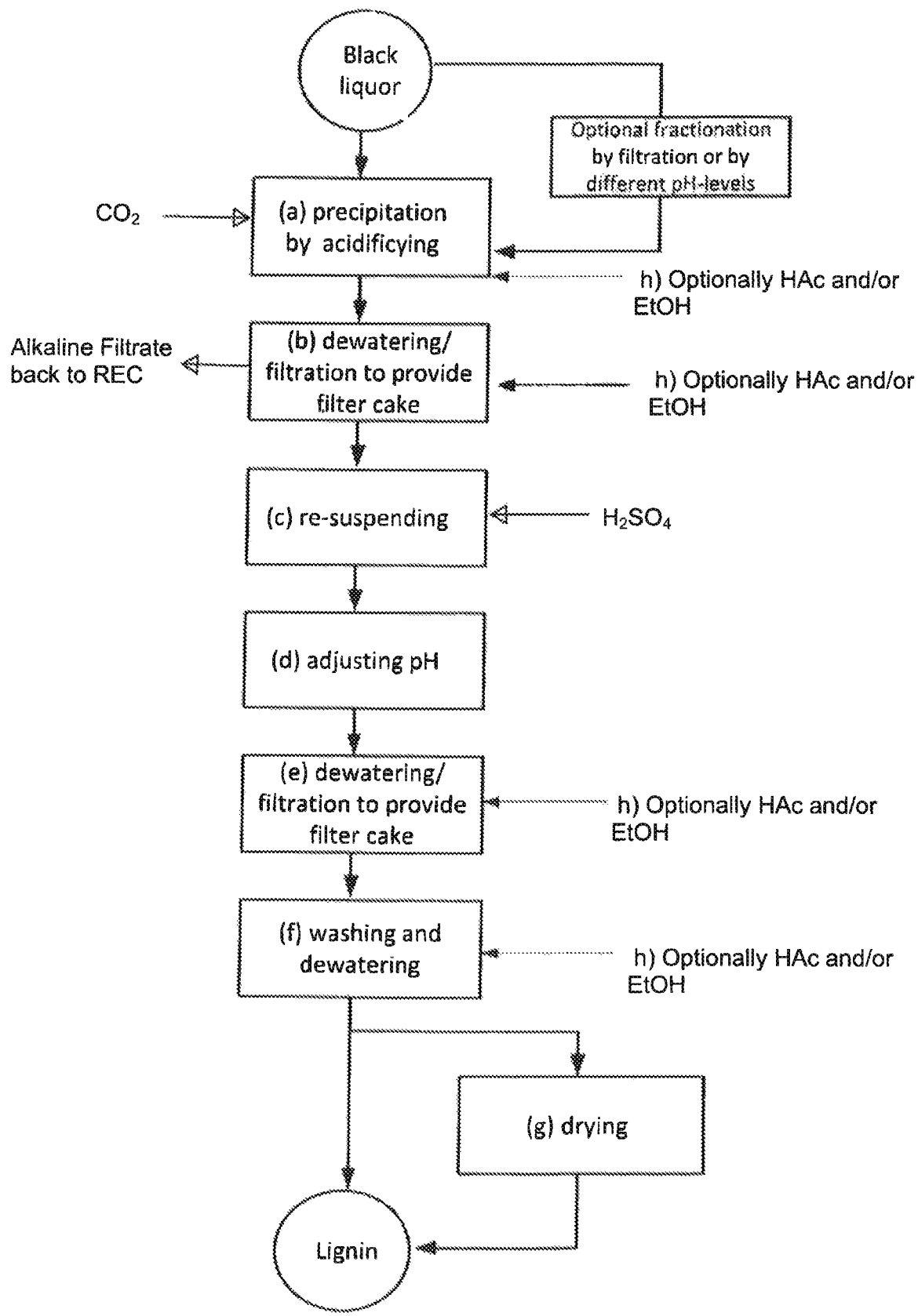
FIG. 4 shows how the inventive addition of alcohol, here in form of EtOH, may be added already into the Lignoboost™ process.

Lignin to be treated according to the present invention can be obtained from a process for separation or isolation of lignin which is illustrated in the flow charts of FIG. 3, and which is also commercially called for "LignoBoost™ process", and FIG. 4 illustrates how the Lignoboost process may be boosted by optionally adding alcohol in differing process positions. In step a) of the process lignin is precipitated by acidifying black liquor obtained from an alkaline chemical pulping process. The chemical process is preferably kraft process. Acidifying can be performed by any means sufficient to acidify black liquor. Preferably the acidifying is performed by adding $CO_2$ to said black liquor in a carbonating stage. Carbon dioxide is the preferred alternative since this acid may be obtained from the pulp mill in form of exhaust gases from the lime kiln. By using carbon dioxide in step a) so as to acidify the black liquor approximately to a pH between 11.5 and 9, normally around pH 10, a lignin product can be obtained, and the filtrate obtained from subsequent dewatering is still alkaline and may be sent to the black liquor evaporation train in the recovery island without changing the pH level of the black liquor flow to said evaporators.

In stage (c) the dewatered lignin filter cake is (still alkaline) resuspended in an acidic slurry using $H_2SO_4$.

The lignin product can be used as fuel or for the production of chemicals and has reasonably low ash content and a low tendency to cause corrosion.

Prior to step a), the process optionally comprises a pre-step in which black liquor can be filtrated for example by membrane filtration. By this mechanical separation it is possible to separate for example particulate material, hemicelluloses and/or it is possible to mechanically fractionate lignin and to obtain a specific fraction of lignin. Another way to achieve fractions of lignin is fractionation by different pH levels and select lignins from a certain pH-window for further processing. In this case may of course alcohols also be used which may improve the overall efficiency in removing odorous substances from the lignin.

In the step b) as illustrated in the flow chart, the obtained lignin is dewatered and/or filtrated in a first dewatering and/or filtration step. Also in this connection the dewatering may be performed by any means to withdraw water, for example by using centrifugation, a filter press apparatus, a band filter, a rotary filter, such as a drum filter, or a sedimentation tank, or similar equipment. For example, when using a filter press apparatus the filter cake obtained through dewatering may be blown through by gas or a mixture of gases, preferably compressed air in order to dispose of the remaining liquid, such as black liquor, before resuspending the obtained cake as set out in step c). The filtrate from the dewatering step can be re-circulated to the pulp mill black liquor recovery system. The pH level adjustment before dewatering/filtration, made by addition of acid preferably $CO_2$ (g), can be combined with an adjustment of ion strength, preferably by using alkali metal ions or multivalent alkaline earth metal ions, most preferred calcium ions. Higher ion strength gives at a given pH lower yield losses of lignin as the lignin becomes more stable. Even though it is a dewatering step could small amounts of alcohol be used during this step, e.g. in the end of or after the dewatering step.

As the first Lignoboost™ product produced was in form of fuel pellets, a reduction of inorganic content was needed as such content could cause corrosion in power boilers. Thus, the step c) comprises re-suspending the lignin to form an acidic suspension by adding $H_2SO_4$. Generally, by a suspension is meant a heterogeneous mixture containing liquid- and small solid particles, such as about 1 μm or larger. The particles in the suspension are able to settle whereby it is possible to obtain a filter cake. Also in this step alcohols could be used to increase removal of odorous substances.

In the step d), the pH level is preferably adjusted to below approximately pH 6, and suitably below approximately pH 4, and preferably below 3.5, e.g. 2-2.5. The pH level is preferably from pH 1.5 to pH 3.5 to ensure that substantially all lignin is re-suspended and to give good filtration properties in the following dewatering filtration step. It is also important in order to isolate a lignin with low content of inorganics. Acidifying can be performed with the same chemicals as in connection with acidifying black liquor and as described above. Alcohols could thus be used herein, possibly together with other acids.

After acidifying, a second dewatering and/or filtration step e) is performed similarly as the above-defined step b). Alcohol could be used also during this step.

In step f), the obtained filter cake is washed and the washing liquid, such as acidified water, can have a pH level of below approximately pH 6, preferably below approximately pH 4. The pH level is most preferred a pH from 1.5 to 3.5. The washing liquid is dewatered and in one embodiment of the invention, the obtained filter cake is treated with the method steps I)-iii) without drying the filter cake before the treatment. This step is suitable to be performed in the presence of alcohols in the washing liquid.

In general, the positive effect of using alcohol treatment in the process above defined by steps a) to f) is probably most efficient if it is used in connection with steps e) and f).

According to another embodiment the method further comprises the step g) of drying the filter cake, whereby the filter cake can be easily e.g. transported.

The filter cake obtained from the final dewatering step above, in connection with the method of treating lignin to reduce odorous substances, either dried in the optional drying step g) or not, may thus be used for the alcohol treatment described in FIGS. 1 and 2. It is to be noted that the acidic reslurrying in stage c and d in the Lignoboost process do not effectively reduce content of guaiacol or etylguaiacol.

With the present method of producing lignin with reduced amount of odorous substances it is possible to obtain high yield, such as over 80% by weight, based on the weight of the isolated start lignin. Even higher yields are possible, such as over 85% and up to about 90-95%. Thus, the method leads only to a minor material loss which is a major advantage. The high yield can be obtained due to the fact that the extraction method is rather moderate meaning that substantially no fractionation of the lignin occurs due to odour reduction process. Mainly only odorous substances, especially organic odorous substances, are extracted. The odorous substances that are extracted with the present method comprise at least guaiacol and etylguaiacol but also one of dimethylsulfide, dimethyldisulphide, dimethyldisulphide, dimethyltetrasulphide, and other phenolic compounds. These substances lead to malodourous gases which have made lignin products difficult to use in indoor applications. The concentration of the odorous substances may be reduced by at least 50%, the concentration being calculated from a peak area of a respective peak in a chromatogram. Preferably, the concentration of the odorous substance is reduced by at least 70%. Thermogravimetry analysis (TGA) of the lignin product produced by the present process shows that the lignin is essentially not affected by the present process. This further supports the conclusion of the present invention that the present process is gentle towards lignin, while the odorous substances can be reduced effectively.

Due to the obtained odour reduction, the lignin product is possible to use in many applications. For example lignin can be used as a component in polymer blends, an additive or filler in building materials, as binding agent in adhesives, and/or for the production of a carbon fibre.

The lignin product can also be used in building materials that are intended for use indoors. Further application areas are for example manufacturing of fibre boards, as a cross-linking agent in vehicle tyres, as antioxidants and as UV-protectors. The application areas are not limited to the above-mentioned areas, other application areas are possible.

The invention is further described in the following example.

EXAMPLE

Similar test has been performed as detailed in previously filed SE1451641-3 (hereby incorporated by reference), having a filing date of Dec. 22, 2014. In SE1451641-3 has been tested to clean lignin obtained from the LignoBoost™ process, using a process where the lignin is first dissolved in an alkaline solution, adding a 1% (on weight) of EtOH, followed by an additional acidification until lignin precipitates again.

In the tests performed according to the invention, but without dissolving the lignin by an alkaline charge and subsequent acidification for precipitation, the same Lignoboost lignin is simply leached in a water solution with a small charge of EtOH (1% on weight) reaching a reduction of guaiacol in the same order as with the cleaning tests of SE1451641-3. This is performed without extra charge of alkali for dissolution of the lignin, and extra charge of acidifier to precipitate lignin again. Thus a rather modest charge of 10% EtOH and an addition of 0.1% sodiumsulfite in a water solution obtains a yield of over 90% odour free lignin, and the leaching do not affect the physical, chemical or mechanical properties of the odour free lignin produced. The surprising finding that a simple water leaching with a modest charge of alcohol provides the same effect as the more complicated process outlined in SE1451641-3 is not fully understood, but the mechanisms may be related to that the guaiacols are bound in small lignin particles or chemically bound to the lignin chains.

The invention claimed is:

1. A method for treatment of lignin to reduce odor from the lignin, wherein:
   the lignin is maintained in solid phase and treated such that the chemical structure and bonding thereof substantially remain, and
   the method comprises
     providing a solid phase lignin containing starting material to be contacted with a water solution comprising alcohol;
     dissolving at least guaiacol and etylguaiacol content from the lignin into the water solution;
     draining off the water solution with its content of guaiacol and etylguaiacol; and
     obtaining a lignin material with a reduced content of guaiacol and etylguaiacol.

2. The method according to claim 1, wherein the lignin containing starting material has dry matter content above 50% (w/w), and a lignin content of this dry matter content exceeding 50% (w/w).

3. The method according to claim 1, wherein the lignin containing starting material is mixed with water and alcohol in any order of mixing, and the resulting mixture is allowed to mature during a residence time of at least 5 minutes before draining off the water solution.

4. The method according to claim 1, wherein the lignin containing starting material is a filter cake subjected to a displacement wash using the water solution comprising alcohol.

5. The method according to claim 1, wherein the content of alcohol in the water solution is in the range of 0.1-50% by weight based on the lignin dry weight.

6. The method according to claim 5, wherein the content of alcohol in the water solution is in the range of 0.5-10% by weight based on the lignin dry weight.

7. The method according to claim 6, wherein the content of alcohol in the water solution is below 5% by weight based on the lignin dry weight.

8. The method according to claim 5, wherein the alcohol content any of ethanol, methanol, propanol or butanol.

9. A method according to claim 1 for treatment of lignin to reduce odor from the lignin, comprising:
   providing a solid phase lignin containing starting material to be contacted with a water solution comprising alcohol;
   dissolving at least guaiacol and etylguaiacol content from the lignin into the water solution;
   draining off the water solution with its content of guaiacol and etylguaiacol; and
   obtaining a lignin material with a reduced content of guaiacol and etylguaiacol,
   wherein the lignin containing starting material is obtained from a process comprising the steps of:
     a. precipitating lignin by acidifying black liquor obtained from an alkaline chemical pulping process;

b. dewatering and/or filtrating the obtained lignin to provide a first filter cake;
c. re-suspending the lignin;
d. adjusting the pH of the obtained suspension in step c) to a pH lower than 6;
e. dewatering and/or filtrating the acidic suspension from step d) to provide a second filter cake; and
f. washing and dewatering the second filter cake so as to obtain the lignin containing starting material.

10. The method according to claim 1, wherein
the water solution is an alcohol containing liquid phase solution, and
said alcohol containing liquid phase solution comprises carboxylic acid.

11. The method according to claim 1, wherein the water solution is an alcohol containing liquid phase solution, and wherein the method further comprises utilizing the alcohol containing liquid phase solution to obtain lignin from black liquor in an alkaline chemical pulping process.

12. The method according to claim 1, wherein the water solution is an alcohol containing liquid phase solution, and the alcohol containing liquid phase solution comprises an acid which is not carboxylic acid.

13. A lignin product obtained and/or obtainable by the method according to claim 1.

14. The lignin product according to claim 13, wherein the concentration of guaiacol and etylguaiacol in the obtained lignin product is at least 50% less than in the lignin containing starting material, the concentration being calculated from a peak area of a respective peak in a chromatogram.

15. A polymer blend comprising the lignin material according to claim 13.

16. An additive comprising the lignin product according to claim 13.

17. A filler for a building material or construction material comprising the lignin product according to claim 13.

18. A binding agent for adhesive, the binding agent comprising the lignin product according to claim 13.

19. A carbon fiber comprising the lignin product according to claim 13.

* * * * *